United States Patent
Park et al.

(10) Patent No.: US 9,834,139 B1
(45) Date of Patent: Dec. 5, 2017

(54) VEHICLE COLLISION WARNING PREVENTION METHOD USING OPTICAL FLOW ANALYSIS

(71) Applicant: PLK Technologies Co., Ltd., Seoul (KR)

(72) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 0 days.

(21) Appl. No.: 15/298,651

(22) Filed: Oct. 20, 2016

(30) Foreign Application Priority Data

Sep. 30, 2016 (KR) .................. 10-2016-0126243

(51) Int. Cl.
*B60Q 1/00* (2006.01)
*B60Q 5/00* (2006.01)
(Continued)

(52) U.S. Cl.
CPC ............ *B60Q 5/006* (2013.01); *B60K 35/00* (2013.01); *B60R 1/00* (2013.01); *G01P 15/18* (2013.01); *G06F 17/11* (2013.01); *G06K 9/00805* (2013.01); *B60R 2300/30* (2013.01); *B60R 2300/8093* (2013.01);
(Continued)

(58) Field of Classification Search
CPC ......... B60C 5/006; B60C 9/008; G01P 15/18; B60R 1/00; B60R 2300/30; B60R 2300/8093; B60K 35/00; G06K 9/00805; G06F 17/11; G06T 2207/10028; G06T 2207/30261; G06T 2207/30241; G06T 2207/10016

USPC .............. 340/435, 436, 937, 903, 555, 437; 348/148, 118; 701/300, 301; 180/167, 180/169
See application file for complete search history.

(56) References Cited

U.S. PATENT DOCUMENTS 5,808,561 A * 9/1998 Kinoshita .......... B60K 31/0008
180/167
6,828,903 B2 * 12/2004 Watanabe ............... G01S 13/87
340/435

(Continued)

FOREIGN PATENT DOCUMENTS

KR 10-0507090 B1 8/2005
KR 10-1407520 B1 6/2014

*Primary Examiner* — Anh V La
(74) *Attorney, Agent, or Firm* — Rabin & Berdo, P.C.

(57) ABSTRACT

A vehicle collision warning prevention method includes the steps of: (a) extracting a forward video of a vehicle and video recognition information from a video recognition module mounted in a vehicle, and detecting a size change rate of a forward object included in the video recognition information at each frame of the forward video; (b) calculating an average OFCR of a predetermined frame section; (c) determining whether a value obtained by subtracting the average OFCR from a current OFCR is less than a predetermined threshold value; (d) determining that a brake operation signal is generated when it is determined that the value is less than the threshold value; (e) determining whether a collision warning signal is generated within a predetermined time after the step (d); and (f) preventing an output of the collision warning signal when the collision warning signal is generated at the step (e).

10 Claims, 6 Drawing Sheets

(51) Int. Cl.
    *G06F 17/11*     (2006.01)
    *B60R 1/00*     (2006.01)
    *B60K 35/00*     (2006.01)
    *G06K 9/00*     (2006.01)
    *G01P 15/18*     (2013.01)

(52) U.S. Cl.
    CPC .......... *G06T 2207/10016* (2013.01); *G06T 2207/10028* (2013.01); *G06T 2207/30241* (2013.01); *G06T 2207/30261* (2013.01)

(56) References Cited

U.S. PATENT DOCUMENTS

2006/0182313 A1*   8/2006   Miyahara .............. G01C 3/22
                                                          382/104
2007/0285217 A1*  12/2007  Ishikawa ........... G06K 9/00805
                                                          340/435

* cited by examiner

X-direction acceleration data (before LPF is applied)

VEHICLE COLLISION WARNING PREVENTION METHOD USING OPTICAL FLOW ANALYSIS

BACKGROUND

1. Technical Field

The present disclosure relates to a method for preventing the generation of a vehicle collision warning signal using optical flow analysis, and more particularly, to a vehicle collision warning prevention method using optical flow analysis, which uses optical flow analysis to determine whether a brake is operated, without receiving a brake signal from a vehicle, and prevents the generation of a collision warning according to the determination result.

2. Related Art

In general, a vehicle collision warning device refers to a device that calculates a relative distance from a forward vehicle using an ultrasonic sensor, laser sensor or video recognition device, and warns a driver using an auditory signal and visual signal when the front vehicle approaches within a distance at which a collision is likely to occur. The driver may recognize a warning signal to put on the brakes, and thus cope with an unexpected situation such as a sudden stop of the forward vehicle, while preventing a collision accident of his/her vehicle and multi-collision accidents connected to the collision accident.

The recent vehicle collision warning device has developed in such a direction that raises the accuracy of relative distance calculation by compensating for the acceleration of a forward vehicle in real time, issues a warning by monitoring even the behavior of a vehicle ahead of the forward vehicle, or raises the accuracy of a sensing signal. That is, the vehicle collision warning device has been focused on recognizing various dangerous situations and raising a warning issue probability, thereby raising the stability.

For example, Korea Patent No. 10-1407520 has proposed a vehicle collision warning system which calculates not only a relative distance between an own vehicle and a forward vehicle but also a relative distance between the own vehicle and a vehicle ahead of the forward vehicle, and monitors even the behavior of the vehicle ahead of the forward vehicle, thereby lowering the occurrence probability of a collision accident. Furthermore, Korean Patent No. 10-0507090 has proposed a vehicle collision warning system capable of raising the reliability of a warning when a risk of collision with a forward vehicle occurs, using a millimeter-wave radar.

However, frequent collision information generated by the vehicle collision warning device may serve as a factor that lowers a stimulating effect for a driver. If a warning is generated even though the driver has a firm intention to avoid a collision, an alarm sound or a visual warning signal outputted to the screen of a navigation system may disperse the driver's attention, thereby disturbing collision avoidance operation.

The surest action indicating the collision avoidance intention of a driver is a brake operation of the driver. When the vehicle collision warning device is installed in a vehicle during a manufacturing process of the vehicle, the vehicle collision warning device may be designed to receive a brake signal from an ECU or hydraulic brake device. However, when a vehicle collision warning device provided through an after market is installed in a vehicle after a manufacturing process, the vehicle collision warning device cannot receive a brake signal from the vehicle because there are various types of vehicles and each of the vehicles provides a different brake signal.

RELATED ART DOCUMENT

Patent Document

Korean Patent No. 10-1407520
Korean Patent No. 10-0507090

SUMMARY

Various embodiments are directed to a vehicle collision warning prevention method using optical flow analysis, which is capable of recognizing a brake operation of a driver using optical flow analysis for a forward video without receiving a brake signal from a vehicle, and suppressing a collision warning, thereby preventing attention dispersion caused by an issue of warning signal and maximizing the stimulating effect of collision warning, when the driver has a firm intention to avoid collision.

In an embodiment, a vehicle collision warning prevention method using optical flow analysis may include the steps of: (a) extracting a forward video of a vehicle and video recognition information from a video recognition module mounted in a vehicle, and detecting a size change rate of a forward object included in the video recognition information at each frame of the forward video; (b) calculating an average optical flow change rate (OFCR) of a predetermined frame section based on a current point of time; (c) determining whether a value obtained by subtracting the average OFCR from a current OFCR is less than a predetermined threshold value; (d) determining that a brake operation signal is generated when it is determined at the step (c) that the value is less than the threshold value; (e) determining whether a collision warning signal is generated within a predetermined time after the step (d); and (f) preventing an output of the collision warning signal when the collision warning signal is generated at the step (e).

In an embodiment, the current OFCR is calculated by Equation (1) below, and the average OFCR is calculated by Equation (2) below:

$$\text{Current } OFCR = OP(i) - OP(i-1), \text{ and} \qquad \text{Equation (1):}$$

$$\text{Average } OFCR = \frac{\sum_{i=2}^{n} OP(i) - OP(i-1)}{n-1}, \qquad \text{Equation (2)}$$

where OP(i) represents an optical flow value of a current frame containing the size information of the forward object, and OP(i−1) represents an optical flow value of a previous frame containing the size information of the forward object.

In an embodiment, the vehicle collision warning prevention method further comprises the steps of, after the step (c):
(c-1) receiving a moving-direction acceleration signal of the vehicle from an acceleration sensor;
(c-2) calculating integrated acceleration by integrating the received acceleration signal; and
(c-3) determining whether the integrated acceleration calculated at the step (c-2) is less than a predetermined threshold value, wherein when it is determined at the step (c-3) that the integrated acceleration is less than the threshold value, it is determined at the step (d) that the brake operation signal is generated.

In an embodiment, the vehicle collision warning prevention method further comprises a noise removing step of removing noise of the received acceleration signal using a low pass filter (LPF), after the step (c-1).

In an embodiment, in the noise removing step, the noise is removed by Equation (3):

$$X_k = \alpha X_{k-1} + (1-\alpha)x_k,$$

where X represents an estimated acceleration value, x a represents a current acceleration value, k represent a natural number, and $\alpha$ represents a constant of $0<\alpha<1$.

In an embodiment, the calculating of the integrated acceleration at the step (c-2) is performed by Equation (4):

$$\text{Integral acceleration} = \int_T^{T+\nabla T} A(T)dT,$$

where T represents time, and A(T) represents the moving-direction acceleration of the vehicle.

DETAILED DESCRIPTION

Hereafter, exemplary embodiments of the present invention will be described with reference to the accompanying drawings. However, the present invention is not limited to the exemplary embodiments, but may include all modifications, equivalents and substitutions within the scope of the present invention.

Figure 1:
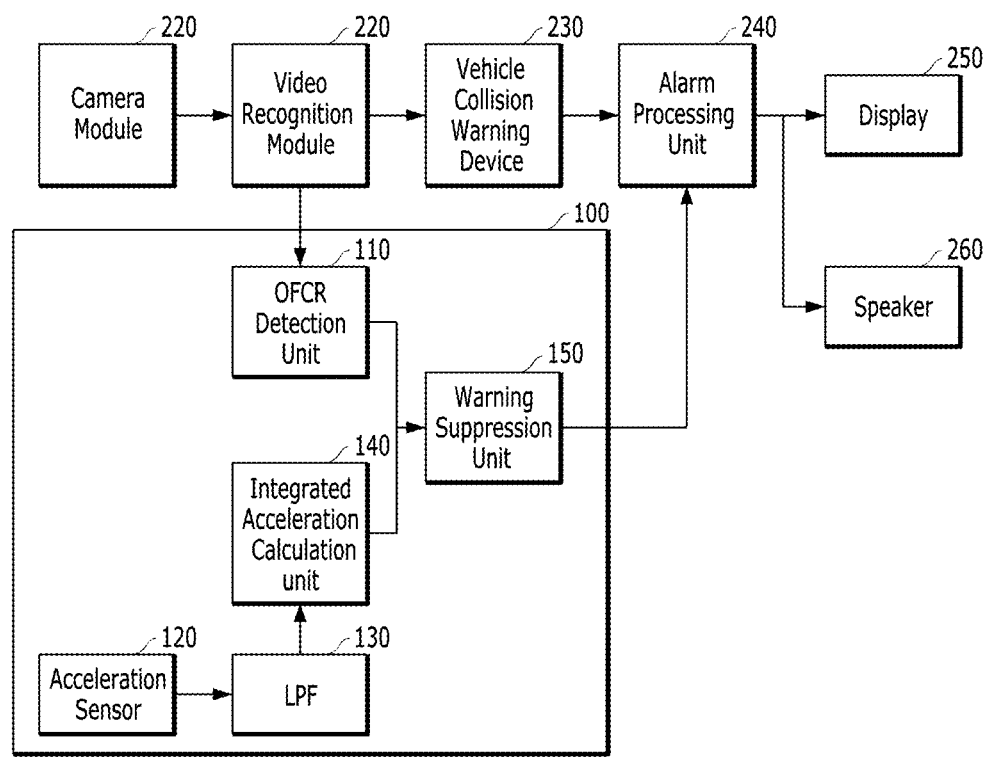
FIG. 1 is a block diagram illustrating a vehicle mounted device to which the present invention is applied.

FIG. 1 is a block diagram illustrating a vehicle mounted device to which the present invention is applied.

The vehicle mounted device indicates an ASV (Advanced Safety Vehicle) device including a vehicle collision warning device or function. Referring to FIG. 1, the vehicle mounted device includes a camera module 210, a video recognition module 220, a vehicle collision warning device 230, an alarm processing unit 240, a display unit 250 and a speaker 260.

The camera module 210 is a unit for taking a forward video of a vehicle. Although not illustrated, a distance measuring unit such as an ultrasonic sensor or radar sensor may be further installed to measure a distance from a forward object.

The video recognition module 220 recognizes a forward vehicle or obstacle from the video taken by the camera module 210, and calculates a relative distance between the recognized forward object and a vehicle in which the video recognition module 220 is installed (hereafter, referred to as own vehicle). The forward video is stored on a frame basis into a memory unit (not illustrated), and video recognition information obtained by recognizing the forward object such as the forward vehicle or obstacle in the forward video is also stored in the memory unit.

The vehicle collision warning device 230 generates a collision warning signal when the forward object approaches within a distance at which a collision is likely to occur. When the collision warning signal is generated, the alarm processing unit 240 outputs a visual warning signal to the display unit 250, and outputs an auditory warning signal to the speaker 260, in order to inform the driver of a collision risk. The process in which the vehicle collision warning device 230 generates the collision warning signal depending on a relative distance from the forward vehicle and outputs the warning signals through the display unit 250 and the speaker 260 may be performed in the same manner as a publicly known FCWS (Front Collision Warning System). Thus, the detailed descriptions thereof are omitted herein.

As illustrated in FIG. 1, the vehicle mounted device to which the present invention is applied further includes an OFCR (Optical Flow Change Rate) detection unit 110, an acceleration sensor 120, an LPF (Low-Pass Filter) 130, an integrated acceleration calculation unit 140 and a warning suppression unit 150.

The OFCR detection unit 110 extracts a forward video of the own vehicle and video recognition information on the forward video from the video recognition module 220. The video recognition information includes information related to a forward object such as a forward vehicle or obstacle of the own vehicle. The OFCR detection unit 110 detects a size change rate of the forward object at each frame of the forward video. Based on the detection result, the OFCR detection unit 110 calculates a current OFCR at the current point of time and an average OFCR corresponding to an OFCR average value of a predetermined frame section.

The acceleration sensor 120 is mounted on the vehicle and detects acceleration including at least the moving-direction acceleration of the vehicle. The LPF 130 filters low-frequency components among signals outputted from the acceleration sensor 120. The integrated acceleration calculation unit 140 calculates integrated acceleration by integrating the filtered acceleration values.

The warning suppression unit 150 compares the calculation result of the OFCR detection unit 110 and the calculation result of the integrated acceleration calculation unit 140 to predetermined threshold values, respectively, and determines whether a brake operation occurred. When determining that a brake operation occurred, the warning suppression unit 150 outputs a warning suppression signal. When the warning suppression unit 150 outputs the warning suppression signal, a collision warning signal which is generated within a predetermined time after the warning suppression signal is outputted may be blocked to prevent the generation of a warning.

Figure 2:
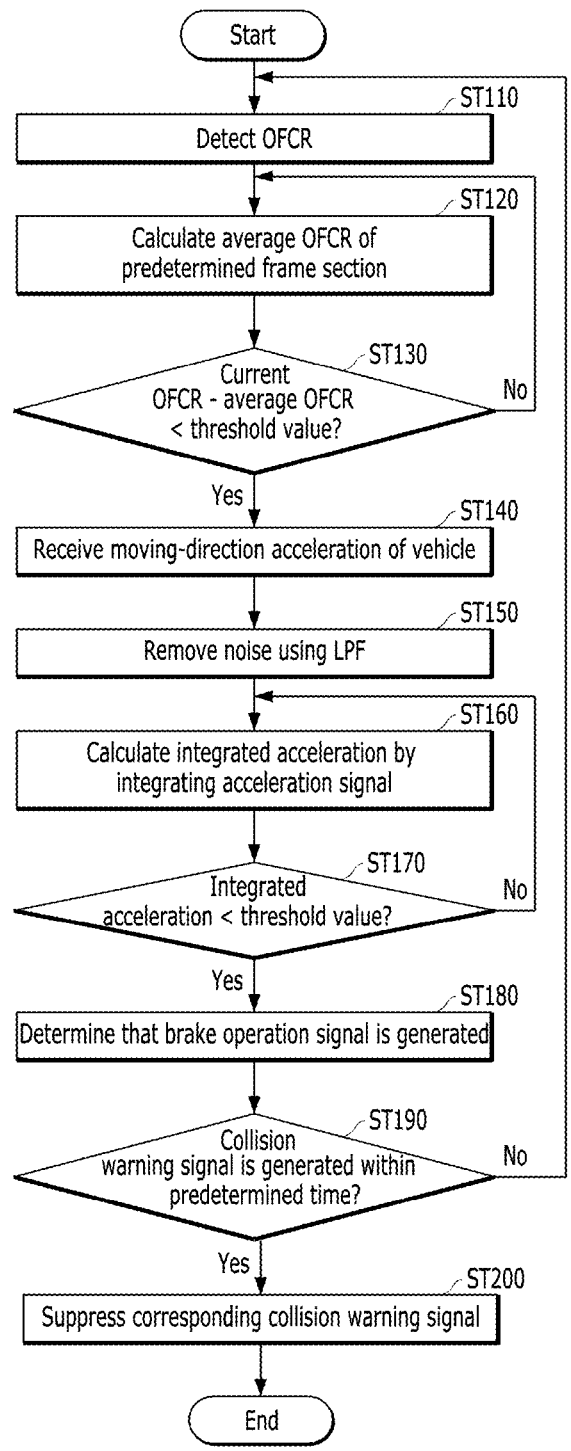
FIG. 2 is a flowchart illustrating a vehicle collision warning prevention method according to an embodiment of the present invention.

FIG. 2 is a flowchart illustrating a vehicle collision warning prevention method according to an embodiment of the present invention. Referring to FIG. 2, the warning prevention process will be described in more detail as follows.

First, the OFCR detection unit 110 detects an OFCR at each frame of a forward video of the own vehicle at ST110.

Figure 3:
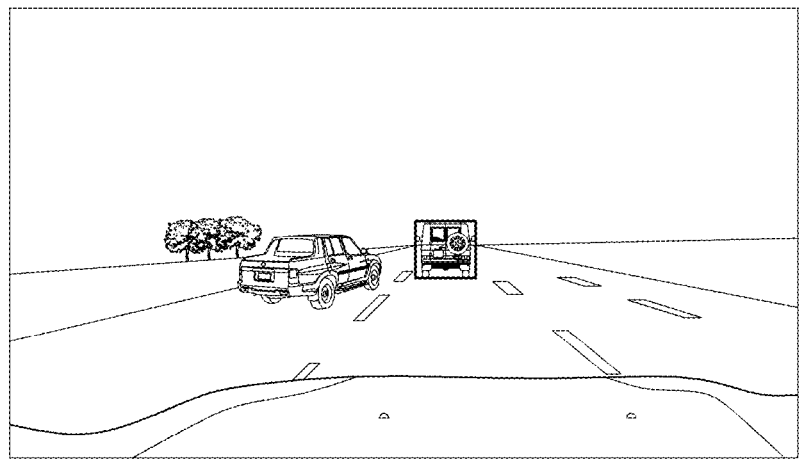
FIGS. 3 to 5 are diagrams illustrating an optical flow change rate (OFCR) detection process according to the embodiment of the present invention.
Figure 4:
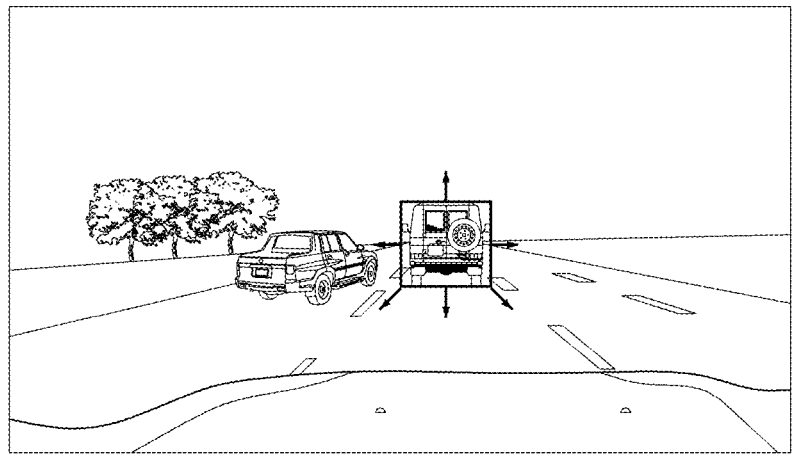
Figure 5:
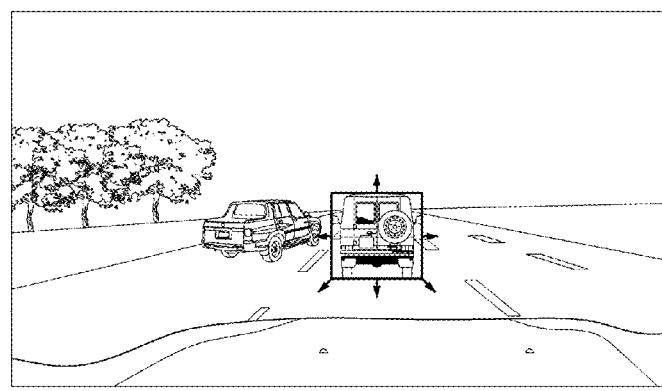

FIGS. 3 to 5 are diagrams illustrating the OFCR detection process according to the embodiment of the present invention.

Referring to FIG. 3, the video recognition module 220 recognizes outer points of a forward vehicle in the forward video of the own vehicle, and generates information on the outer points. The OFCR detection unit 110 may extract the size information of the forward vehicle (for example, the size of a rectangular box in FIG. 3) from the video frame of FIG. 3. When the video frame of FIG. 3 is the initial video frame, the OFCR detection unit 110 may detect an OFCR from the next video frame.

Referring to FIG. 4, when the forward vehicle in FIG. 3 approaches the own vehicle, the size of the rectangular box in the video frame increases while the size of the vehicle is expanded. At this time, the size of arrows around the rectangular box may indicate the OFCR. When the OFCR gradually increases, it may indicate that the forward vehicle gradually approaches the own vehicle. Thus, a collision warning may be generated.

Referring to FIG. 5, the size of the forward vehicle and the size of the arrows are not almost changed in comparison to FIG. 4, even though additional video frames were provided. That is, when the OFCR is insignificant as illustrated in FIG. 5, it may indicate that a driver is operating the brake or decelerating the own vehicle to maintain the distance from the forward vehicle or the own vehicle is being away from the forward vehicle. In this case, the generation of a collision warning needs to be prevented.

That is, the OFCR detection unit 110 may detect the OFCR by comparing the video frames of FIGS. 3 to 5 to the previous frames.

At the next step ST120, the OFCR detection unit 110 calculates an average OFCR at a predetermined frame section.

Figure 6:
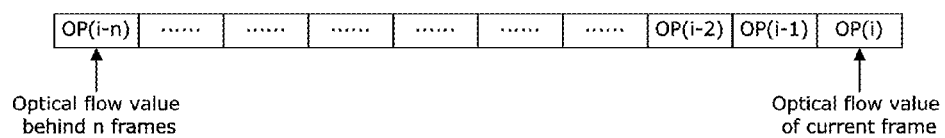
FIG. 6 is a diagram illustrating OFCR values in the embodiment of the present invention.

FIG. 6 is a diagram illustrating OFCR values in the present embodiment. Referring to FIG. 6, each block indicates an optical flow value containing the size information of a forward object, the rightmost block indicates an optical flow value of a current frame, and the leftmost block indicates an optical flow value of a frame behind n frames. In the data blocks of FIG. 6, the current OFCR may be calculated by Equation (1) below, and the average OFCR may be calculated by Equation (2) below.

$$\text{Current OFCR} = OP(i) - OP(i-1) \quad \text{Equation (1)}$$

Equation (2)

$$\text{Average } OFCR = \frac{\sum_{i=2}^{n} OP(i) - OP(i-1)}{n-1} \quad \text{Equation (2)}$$

In Equations (1) and (2), OP(i) represents the optical flow value of the current frame containing the size information of the forward object, and OP(i−1) represents the optical flow value of the previous frame containing the size information of the forward object.

Referring back to FIG. 2, the OFCR detection unit 110 determines whether a value obtained by subtracting the average OFCR from the current OFCR is less than a predetermined threshold value, at step ST130. For example, the threshold value may be set to '0' or a negative number. When the subtraction result exceeds the threshold value, it may indicate that the forward object gradually approaches the own vehicle. Thus, a warning needs to be normally generated. When the subtraction result exceeds the threshold value, the procedure returns to step ST120.

On the other hand, when the subtraction result is less than the threshold value, it may indicate that the distance from the forward object is maintained. In this case, a warning needs to be prevented according to the purpose of the present invention. When the subtraction result is less than the threshold value, the procedure proceeds to step ST140 to receive a moving-direction acceleration signal from the acceleration sensor 120.

Figure 7:
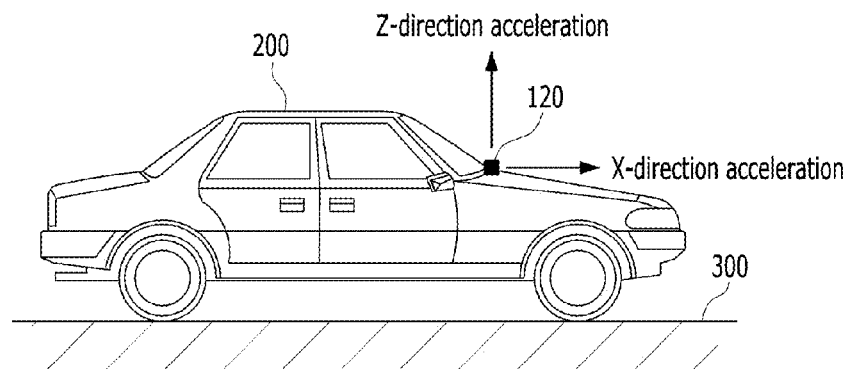
FIG. 7 is a diagram illustrating a process of acquiring a moving-direction acceleration signal of a vehicle in the embodiment of the present invention.

FIG. 7 is a diagram illustrating a process of acquiring a moving-direction acceleration signal in the vehicle collision warning prevention method according to the embodiment of the present invention.

Referring to FIG. 7, the acceleration sensor 120 mounted on the vehicle 200 outputs X-direction acceleration data and Z-direction acceleration data, when the acceleration sensor 120 is a two-axis sensor. The X-direction corresponds to the moving direction of the vehicle, and the Y-direction corresponds to a direction perpendicular to the ground surface 300. In the present embodiment, the X-direction acceleration data are received in order to determine whether the brake is operated. Even when the vehicle 200 runs on an uphill or downhill road, the moving direction of the vehicle with respect to the ground surface 300 is maintained in a horizontal state at all times. Thus, when the vehicle 200 travels on an uphill or downhill road, the X-direction acceleration data do not need to be corrected.

Then, the LPF 130 removes noise of the received acceleration signal at step ST150. The noise removal step ST150 is performed by Equation 3 below.

$$X_k = \alpha X_{k-1} + (1-\alpha)x_k \quad \text{Equation (3)}$$

In Equation (3), X represents an estimated acceleration value, x represents a current acceleration value, k represents a natural number, and α represents a constant.

Figure 8:
FIG. 8 is a waveform diagram illustrating the waveform of an acceleration signal before a low-pass filter (LPF) is applied.
Figure 9:
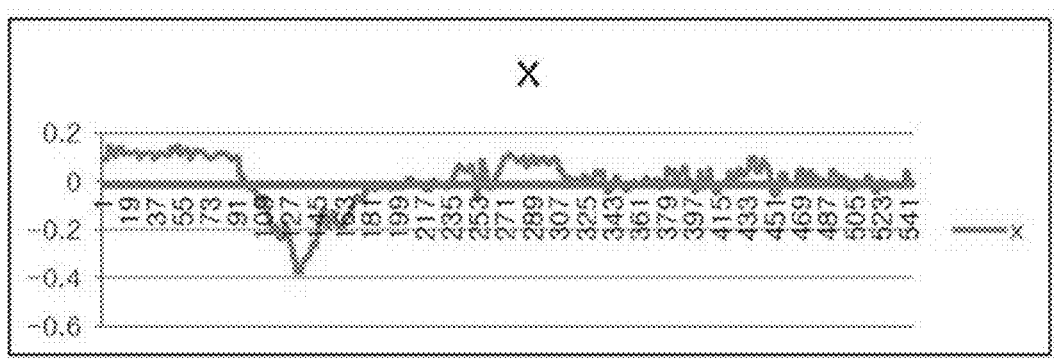
FIG. 9 is a waveform diagram illustrating the waveform of the acceleration signal after the LPF is applied.

FIG. 8 is a waveform diagram illustrating the waveform of an acceleration signal before the LPF is applied, and FIG. 9 is a waveform diagram illustrating the waveform of an acceleration signal after the LPF is applied.

The noise of the X-direction acceleration signal in FIG. 8 may be removed as illustrated in FIG. 9. Thus, the detection accuracy for the stop intention of the driver may be improved.

Then, the integrated acceleration calculation unit 140 calculates integrated acceleration by the noise-filtered acceleration signals at step ST160. The calculation of the integrated acceleration is performed by Equation (4) below.

$$\text{Integral acceleration} = \int_T^{T+\nabla T} A(T)dT \quad \text{Equation (4)}$$

In Equation (4), T represents time, and A(T) represents the moving-direction acceleration of the vehicle.

Then, the warning suppression unit 150 compares the integrated acceleration the predetermined threshold value, in order to determine whether the integrated acceleration is less than the threshold value, at step ST170. The threshold value may be acquired through a simulation test.

When it is determined at step ST170 that the integrated acceleration is equal to or more than the threshold value, it may indicate that the driver is not operating the brake. Thus, a warning needs to be normally generated.

On the other hand, when it is determined at step ST170 that the integrated acceleration is less than the threshold value, the vehicle collision warning prevention determines that the driver is operating the brake, that is, a brake operation signal is generated, at step ST180. Furthermore, the vehicle collision warning prevention method determines whether a collision warning signal is generated within a predetermined time, at step S190.

When no collision warning signal is generated within the predetermined time, the procedure returns to step ST110 to restart the brake operation detection flow.

When it is determined at step ST190 that a collision warning signal was generated, the warning suppression unit 150 suppresses an output of the collision warning signal at step ST200. That is, the warning suppression unit 150 may determine that the driver operated the brake and prevent a collision warning alarm, thereby helping the driver to concentrate on collision avoidance operation in a state where the driver's attention is not dispersed by a warning signal.

According to the embodiment of the present invention, the vehicle collision warning prevention method using optical flow analysis can recognize a brake operation of a driver from an optical flow analysis result, even when a brake signal cannot be received from a vehicle as in a vehicle mounted device applied through an after market, and prevent a collision warning signal when a driver has a firm intention to avoid collision, thereby preventing the attention dispersion caused by frequent warning issues.

While various embodiments have been described above, it will be understood to those skilled in the art that the embodiments described are by way of example only. Accordingly, the disclosure described herein should not be limited based on the described embodiments.

What is claimed is:

1. A vehicle collision warning prevention method using optical flow analysis, comprising the steps of:
   (a) extracting a forward video of a vehicle and video recognition information from a video recognition module mounted in the vehicle, and detecting a size change rate of a forward object included in the video recognition information at each frame of the forward video by an optical flow change rate detection unit;
   (b) calculating an average optical flow change rate (OFCR) of a predetermined frame section based on a current point of time by the optical flow change rate detection unit;
   (c) determining whether a value obtained by subtracting the average OFCR from a current OFCR is less than a predetermined threshold value by a warning suppression unit;
   (d) determining that a brake operation signal is generated when it is determined at the step (c) that the value is less than the threshold value by the warning suppression unit;
   (e) determining whether a collision warning signal is generated within a predetermined time after the step (d); and
   (f) preventing an output of the collision warning signal when the collision warning signal is generated at the step (e).

2. The vehicle collision warning prevention method of claim 1, wherein the current OFCR is calculated by Equation (1) below, and the average OFCR is calculated by Equation (2) below:

$$\text{Current OFCR} = OP(i) - OP(i-1), \text{ and} \qquad \text{Equation (1):}$$

$$\text{Average } OFCR = \frac{\sum_{i=2}^{n} OP(i) - OP(i-1)}{n-1}, \qquad \text{Equation (2)}$$

where OP(i) represents an optical flow value of a current frame containing the size information of the forward object, and OP(i−1) represents an optical flow value of a previous frame containing the size information of the forward object.

3. The vehicle collision warning prevention method of claim 1, further comprising the steps of, after the step (c):
   (c-1) receiving a moving-direction acceleration signal of the vehicle from an acceleration sensor;
   (c-2) calculating integrated acceleration by integrating the received acceleration signal; and
   (c-3) determining whether the integrated acceleration calculated at the step (c-2) is less than a predetermined threshold acceleration value by an integrated acceleration calculation unit,
   wherein when it is determined at the step (c-3) that the integrated acceleration is less than the threshold value, it is determined at the step (d) that the brake operation signal is generated.

4. The vehicle collision warning prevention method of claim 2, further comprising the steps of, after the step (c):
   (c-1) receiving a moving-direction acceleration signal of the vehicle from an acceleration sensor;
   (c-2) calculating integrated acceleration by integrating the received acceleration signal; and
   (c-3) determining whether the integrated acceleration calculated at the step (c-2) is less than a predetermined threshold acceleration value by an integrated acceleration calculation unit,
   wherein when it is determined at the step (c-3) that the integrated acceleration is less than the threshold value, it is determined at the step (d) that the brake operation signal is generated.

5. The vehicle collision warning prevention method of claim 3, further comprising a noise removing step of removing noise of the received acceleration signal using a low pass filter (LPF), after the step (c-1).

6. The vehicle collision warning prevention method of claim 4, further comprising a noise removing step of removing noise of the received acceleration signal using a low pass filter (LPF), after the step (c-1).

7. The vehicle collision warning prevention method of claim 5, wherein in the noise removing step, the noise is removed by Equation (3):

$$X_k = \alpha X_{k-1} + (1-\alpha) x_k,$$

where X represents an estimated acceleration value, x a represents a current acceleration value, k represent a natural number, and α represents a constant of 0<α<1.

8. The vehicle collision warning prevention method of claim 6, wherein in the noise removing step, the noise is removed by Equation (3):

$$X_k = \alpha X_{k-1} + (1-\alpha) x_k,$$

where X represents an estimated acceleration value, x a represents a current acceleration value, k represent a natural number, and α represents a constant of 0<α<1.

9. The vehicle collision warning prevention method of claim 3, wherein the calculating of the integrated acceleration at the step (c-2) is performed by Equation (4):

$$\text{Integral acceleration} = \int_{T}^{T+\nabla T} A(T) dT,$$

where T represents time, and A(T) represents the moving-direction acceleration of the vehicle.

10. The vehicle collision warning prevention method of claim 4, wherein the calculating of the integrated acceleration at the step (c-2) is performed by Equation (4):

$$\text{Integral acceleration} = \int_{T}^{T+\nabla T} A(T) dT,$$

where T represents time, and A(T) represents the moving-direction acceleration of the vehicle.

* * * * *